DEVICE FOR PRODUCING LINE HALFTONE IMAGES SIMILAR TO THE IMAGES PRODUCED BY THE WOODCUT TYPE METHOD OF PRINTING

Filed Feb. 23, 1967 2 Sheets-Sheet 1

Inventor:
RICHARD J. KLENSCH
By John T. O'Halloran
Attorney

Inventor:
RICHARD J. KLENSCH
By John O'Halloran
Attorney

United States Patent Office 3,517,119

Patented June 23, 1970

3,517,119

DEVICE FOR PRODUCING LINE HALFTONE IMAGES SIMILAR TO THE IMAGES PRODUCED BY THE WOODCUT TYPE METHOD OF PRINTING

Richard J. Klensch, Trenton, N.J., assignor to RCA Corporation, a corporation of Delaware Filed Feb. 23, 1967, Ser. No. 617,958
Int. Cl. H04n 5/84
U.S. Cl. 178—6.7 2 Claims

ABSTRACT OF THE DISCLOSURE

The electronic halftone image generator generates halftone images by producing on the face of a cathode ray tube scanlines that have varying widths that are a function of the tones in a continuous tone original image. Such a line halftone image is obtained by modulating each scanline by an alternating modulating signal whose amplitude depends on the tones in a continuous tone image. The frequency of the modulating signal is selected to cause the scanning beam spot to merge on succesive cycles of the modulaitng signal so as to cause the amplitude of the modulating signal to effectively determine the varying widths of the scanlines. An undulating effect is produced in the scanlines by providing a lower frequency oscillator and superimposing the lower frequency oscillations onto the vertical deflection of both the device that scans the original image and the cathode ray tube. The undulating scanlines on the cathode ray tube are imaged onto a photographic film so that a halftone reproduction of the original image is created which is similar to an image produced in the woodcut halftone type of printing.

Background of the invention

The printing processes commonly used in the graphic arts industry, i.e. newspapers, book publishing, etc. deposit a substantially uniform density of ink on paper whenever it is desired to print all or a portion of an image and deposit no ink when the absence of an image is desired. This all-or-nothing process poses no problems when alphabetical and other characters are to be printed. However, when pictures such as photographs are to be printed, the problem of reproducing the continuous tones (i.e. light gradations) arises. This problem is solved by transforming the continuous tones of the original image into halftone images. The most common halftone images are produced by a large number of inked dots of various sizes. When the largest dots and the white paper between the dots are made small compared with the visual acuity of the human eye, the dots and the paper between the dots fuse visually and trick the human eye into believing it is seeing continuous tones.

To convert the production of newspapers, books, etc. into an automatic printing process, it is necessary that continuous tone images such as photographs be electronically converted into halftone images so as to insure compatibility with presently available electronic type composition systems. One known electronic system, for example, produces alphanumeric characters on the face of a cathode ray tube in a line of print under the command of an electronic data processor, such as a computer. The line of print is automatically hyphenated and justified by the computer with present known techniques. The displayed alphanumeric characters are photographed and the photograph is processed into a printing plate, such as for offset printing.

To automatically produce halftone images of photographs that are compatible with such an electronic photo composition system, an electronic dot system of producing halftone images was developed and is described in a co-pending application entitled, "Halftone Image Generator System," for Carl R. Corson, filed Mar. 21, 1966, Ser. No. 535,884 now U.S. Pat. No. 3,463,880 and assigned to the same assignee as the present invention. In addition to the generation of electronic halftone images by means of dots, it is desirable to produce electronic halftone images by means of lines, such as variable width lines. Such line halftone images are similar to the images produced by the woodcut type method of printing.

Summary of the invention

An electronic halftone image generator embodying the invention includes an imaging device that is scanned by a scanning beam. Halftone images are produced by varying the width of each scanline or a portion thereof as a function of the tones in a continuous tone image.

Detailed description

Figure 1:
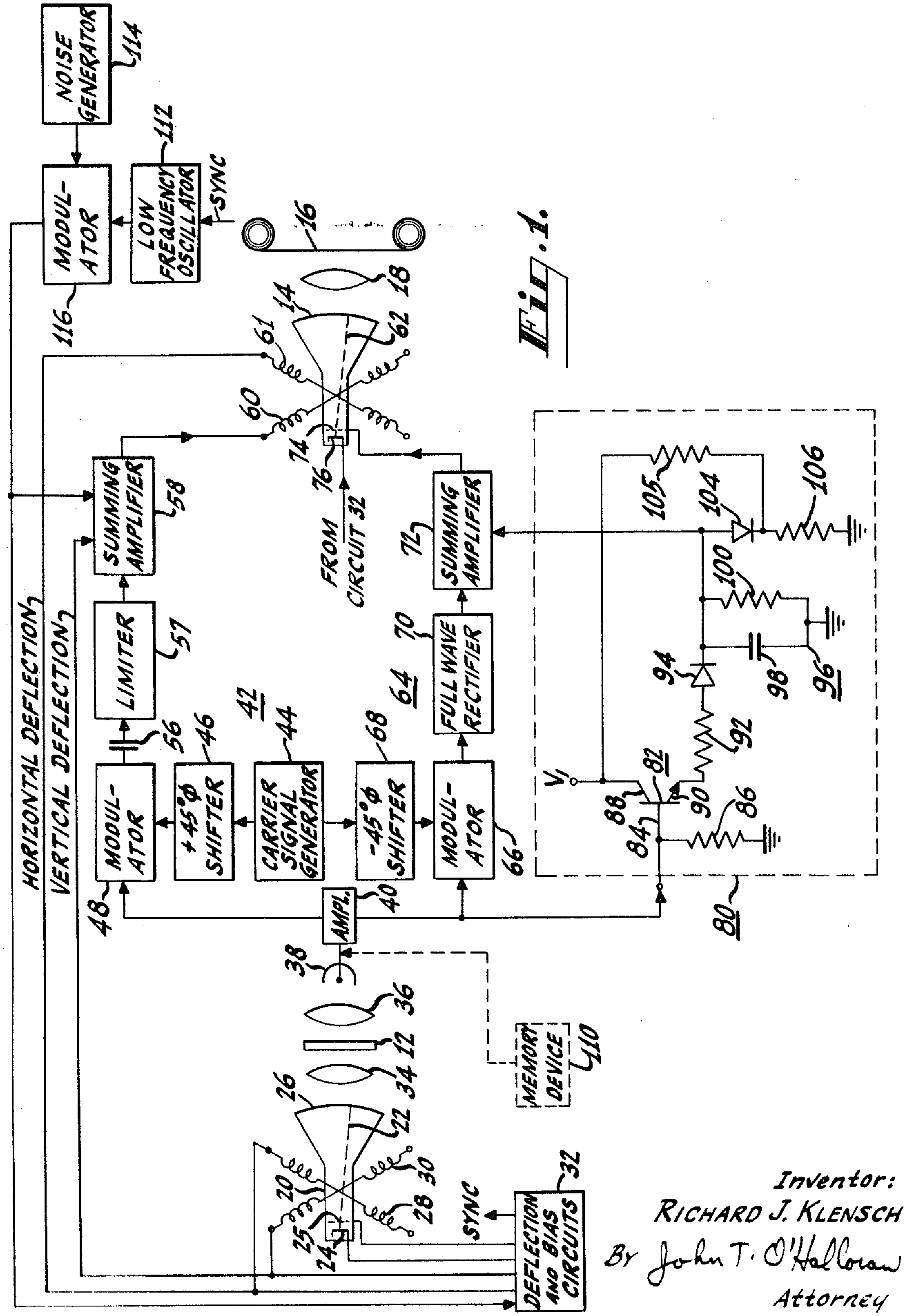
FIG. 1 is an electronic halftone image generating system embodying the invention.

Referring now to FIG. 1, an electronic line halftone image generating system 10 converts a continuous tone image on a transparency 12 into a halftone image on the face of an imaging device, such as a cathode ray tube 14. The line halftone image displayed on the face of the cathode ray tube 14 is focused onto a photographic film 16 by means of a lens system, illustrated in FIG. 1 as a single convex lens 18 to provide a halftone image from which a printing plate may be obtained. The line halftone image is obtained by first scanning the transparency 12 by means of a scanner 20. The scanner 20 may, for example, comprise a flying spot scanner having an electron beam 22 emanating from a cathode 24 under the control of a grid 25 and producing a spot of light on the face 26 of the scanner 20. The scanning beam 22 and hence the light spot is deflected horizontally in a relatively fast scan by a horizontal deflection coil 28, and vertically in a relatively slow scan by a vertical deflection coil 30. Such deflection produces a television type raster scanning pattern. Deflection and bias circuits 32 are coupled to the scanner 20 to produce the above-mentioned deflection as well as bias the scanner 20 into operation. The scanlines in the scanner 20 commence in the upper left hand portion of the face 26 of the scanner 20 and scan horizontally to the right, with a quick retrace at the end of the scanline back to the left of the face 26. The scanlines simultaneously move down the face 26 of the scanner 20 until the scanning beam 22 reaches the bottom of the face 26. At that time the beam is retraced back to its initial starting point. In both the horizontal and the vertical retrace periods, the cathode 24 is blanked by blanking pulses derived from the deflection and bias circuits 32. Interlaced scanning may be utilized and in such a case, the deflection and bias circuits 32 may be standard television type circuits.

The scanning spot of light produced by the scanner 20 is focused onto the transparency 12 by means of a lens system, illustrated as a convex lens 34. The light penetrating through the transparency 12 depends on the density (i.e. lightness and darkness or light gradations) of the tones in the original image contained on the transparency 12. The light penetrating through the transparency 12 is collected by means of a second convex lens 36 onto a light sensor such as a phototube or photodiode 38. It is to be noted that a typewriter scanning pattern, a vertical raster pattern, or a jump scan pattern may also be utilized to scan the transparency 12. A television type scanning raster is however more convenient since the deflection and bias circuits 32 may then comprise standard television circuitry. The scanner 20 may also comprise a mechanical scanner rather than an electron tube scanner.

The light image signal transmitted through the transparency 12 generates a relatively high amplitude electronic image signal in the photodiode 38 when the tone scanned in the transparency 12 has a low density (i.e. is light) and a relatively low amplitude electronic image signal when the tone scanned has a high density (i.e. is dark). Consequently, the electronic image signals faithfully simulate in amplitude the continuous tones present in the transparency 12. The photographic image 12 may also be opaque, and in such a case light reflected from the image, rather than the light transmitted through the image, is utilized to obtain the halftone image. The electronic image signals are amplified by the amplifier 40 and applied to a halftone electronic image generator 42. The halftone generator 42 produces halftones in the form of varying line widths rather than varying dot sizes. The halftone generator 42 includes a carrier signal generator 44 that generates a continuous sine wave signal of a preselected amplitude and frequency. The carrier signal generated by the generator 44 is applied through a +45° angle phase shifter 46 to a modulator 48. The electronic image signals from the amplifier 40 are also applied to the modulator 48. The modulator 48 effectively mixes the carrier signal and the electronic image signals to provide a modulated signal. The modulator 48 may for example comprise a square law modulator such as a diode modulator exhibiting a characteristic such as the curve 50 in FIG. 2. In the absence of a light tone on the transparency 12, the modulator 48 quiescently operates at the point 51 of the curve 50 in FIG. 2. Consequently, a carrier signal 52 from the generator 48 is effectively suppressed in the modulator 48 and hence the modulator 48 produces no output signal. However, when a light tone on the transparency 12 produces an electronic image signal, such as the signal 53 in FIG. 2, the modulator 48 is then operated at the point 54 and produces an output signal 55. The output signal is effectively an amplified version of the carrier signal 52 with a direct current component. The amplitude of the output signal 55 is a function of the amplitude of the electronic image signal 53 and hence the tone on the transparency 12. The signal 55 is used as a modulating signal to vary the width of the scanlines as a function of the tones on the transparency 12.

The direct current component in the signal 55 is removed by coupling this signal through a capacitor 56 to a limiter 57. The limiter 57 limits the swings of the modulating signal 55 so that the alternatoins in one scanline do not overlap the alternations in an adjacent scanline on the face of the tube 14. It is to be noted that a balanced modulator may be substituted for the modulator 48. In such a case, no direct current component is produced and hence need not be eliminated. The modulating signal 55 is coupled through the limiter 57 to form one input to a summing amplifier 58. Another imput signal to the amplifier 58 is a vertical deflection signal derived from the deflection circuits 32. The amplifier 58 sums the input signals and applies the summed output to a vertical deflection coil 60 of the imaging device 14. The summed signals modulate the scanlines produced by an electron beam 62 in the device 14 to produce a horizontal scanline that is deflected vertically an amount equivalent to the output or modulating signal 55 in FIG. 2. Such scanlines resemble the scanlines *c*, *d*, and *e*, in FIG. 3.

Figure 3:
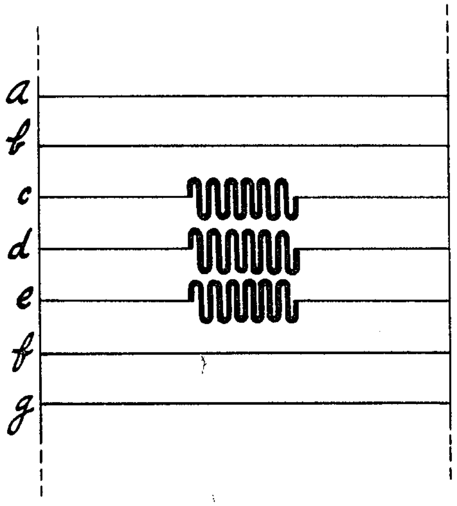
FIG. 3 is a graphical representation of the scanlines generated by the system of FIG. 1.

As shown in FIG. 3 the scanlines *a* and *b* are merely the width of the scanning beam 62 in the cathode ray tube 14. When the modulating signal 55 is larger, the scanlines are deflected vertically. Since the frequency of the carrier signal 52 is selected to cause the scanlines to just touch on successive cycles, the effective width of the scanlines is made larger or smaller by the modulating signal 55.

When an electron beam is deflected in an alternating scanning pattern, such as a sinewave pattern, the scanning beam 62 exhibits different velocities depending upon the portion of the sinewave cycle that the beam 62 is traversing. These differences in velocity tend to produce unequal exposures on the film 16 and consequently, an electron beam intensity compensation circuit 64 is provided to compensate for this. Accordingly, the electronic image signals derived from the amplifier 40 are applied to a second modulator 6 along with the carrier signal from the generator 44. However, the carrier signal is phase shifted in the phase shifter 68 by an angle of —45° before being applied to the second modulator 66. Since the carrier signal was phase shifted by an angle of +45° in the phase shifter 46 before being applied to the first modulator 48, the carrier signals applied to the modulators 48 and 66 are 90° out of phase with each other. It is to be recalled that the peak amplitude of a sinewave signal exhibits a low velocity whereas the zero ampltiude of such a wave exhibits a high velocity. Since the peak and zero points are 90° out of phase with each other, the phase shifters 48 and 68 duplicate this phase shift at these points. Correspondingly, the modulator 66 produces an output wave substantially identical to the wave 55 in FIG. 2 but 90° out of phase with the wave 55. Mathematically, the derivative of a sinewave is a cosine wave which is merely a sinewave displaced by 90°. With such a displaced wave, compensation or correction is effected over the entire cycle. Such an output wave is then full wave rectified by a full wave rectifier 70 to remove negative correction signal and coupled to a summing amplifier 72 before application to the control grid 74 of the cathode ray tube 14. Thus the compensation circuit 64 intensifies the scanning spot (i.e. accelerates the electrons in the beam 62 toward the face of the tube 14) when the beam 62 is being deflected the fastest and reduces the intensity when the beam is being deflected the slowest. Hence the image produced on the film 16, which may be high gamma film, is maintained uniform.

Also included in the system 10 is a toner expander circuit 80. The tone expander circuit 80 effectively turns on the scanning beam 62 in the cathode ray tube 14 only when the electronic image signals are above a predetermined threshold level. Signals below this level represent dark tones on the transparency 12 and to distinguish them from lighter tones that barely deflect the scanning beams 62, it is necessary to have the beam 62 off when such dark tones are scanned. Thus the tone range of the system 10 is expanded significantly by the circuit 80.

The tone expander circuit 80 includes a transistor 82 having a base 84 coupled to receive the electronic image signals from the amplifier 40. The base 84 is coupled to a point of reference potential or ground in the system 10 by means of an input resistor 86. The transistor 82 is biased by coupling the collector 88 thereof to the positive potential terminal of a bias source $V_1$. Although the bias source $V_1$ is shown separate to the bias circuits 32 for convenience, the source $V_1$ may be a part of the circuits 32. The transistor 82 is operated as an emitter follower and consequently the emitter 90 thereof is coupled through a resistor 92 and a forwardly poled diode 94 to an R-C circuit 96. The R-C circuit 96 includes the parallel combination of a capacitor 98 and a resistor 100 coupled between the cathode of the diode 94 and circuit ground. The R-C circuit exhibits a fast charge time constant depending on resistor 92 and capacitor 98 and a discharge time constant depending on capacitor 98 and resistor 100. The ungrounded junction of the circuit 96 is coupled to the summing amplifier 72 as well as to the anode of clamping diode 104. The cathode of the diode 104 is coupled to the positive terminal of the source $V_1$ through a resistor 105 as well as through a resistor 106 to circuit ground. The resistors 105 and 106 comprise a voltage divider to establish a threshold reference voltage for the diode 104. The cathode 76 of the tube 14 is normally biased with respect to the grid 74 to keep the tube 14 cut off in the absence of an output from the expander circuit 80. When low level electronic image signals are received, the transistor 82 turns on to charge the capacitor 98 positively with respect to ground. Such a charge reduces the negative grid cathode bias and turns on the tube 14. The electronic image signal levels determine the output of the expander circuit 80 until the threshold reference is reached at the diode 104 and then the diode 104 conducts to clamp the output at this threshold reference level. The threshold reference level is established to prevent highly deflected image signals from being brighter than smaller deflected image signals.

Both the vertical 60 and the horizonal 61 deflection coils of the cathode ray tube 14 are synchronized to the flying spot scanner 20 by coupling these coils to the deflection and bias circuits 32. Thus the electronic beams 22 and 62 are deflected in synchronism with each other to insure that the continuous tones in the transparency 12 are reproduced and juxtaposed correctly on the photographic film 16.

Operation

Figure 2:
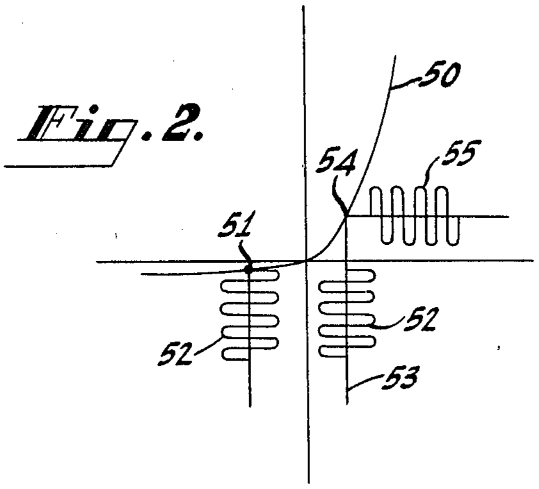
FIG. 2 is a graph illustrating the modulation characteristics of the scanline width modulator in the system of FIG. 1.

To produce a line width modulated halftone image of the continuous tone on the transparency 12, the transparency 12 is scanned by the scanner 20, to generate electronic image signals in the photodiode 38. The electronic image signals exhibit amplitudes corresponding to the tones on the transparency 12. The electronic image signals are amplified in the amplifier 40 and modulated in the modulator 48 by the carrier signal from the generator 44. The modulating signal from the modulator 48 is added in the amplifier 58 to the vertical deflection signal from the deflection circuits 32, and applied to the vertical deflection coil 60 of the tube 14. When the tones on the transparency 12 are of high density or dark, the electronic image signal may produce substantially no output from the modulator 48. Additionally, in such a case the transistor 82 in the tone expander circuit 80 may not turn on. Consequently, the bias between the cathode 76 and the grid 74 of the tube 14 keeps the scanning beam 62 blanked. When a less dense continuous tone is scanned by the scanner 20, the transistor 82 turns on to positively charge the capacitor 98 rapidly through the resistor 92. The output of the expander circuit 80 turns on the beam 62 and it is deflected by the coils 60 and 61. The scanlines *a* and *b* in FIG. 3 may result from such dark tones. It is to be noted that neither of these scanlines are deflected vertically because the tone is still too dark to produce an output signal from the modulator 48. When a light or low density tone is detected in the transparency 12 such as illustrated in the center of the scanlines *c, d,* and *e* of FIG. 3, the electronic image signals generated in the photodiode 38 are of sufficient amplitude to produce an output signal from the modulator 48, as well as one from the modulator 66. The output signal from the modulator 48, the signal 55 in FIG. 2, is applied as a scanline modulating signal to be added to the vertical deflection signal, the slower scanning signal, in the summing amplifier 58. If as in a vertical line scanning raster, the horizontal deflection signal is the slower scanning signal, then the signal 55 is added to this slower signal. The scanning beam 62 alternates as shown in scanlines *c, d,* and *e* of FIG. 3 to trace out a light tone area on the face of the cathode ray tube 14. Simultaneously the output signal from the modulator 66 intensity modulates the scanning beam 62 to provide a uniform beam intensity regardless of the linear velocity of the beam 62 in its various alternations.

It is to be noted that the size of the scanning spot, the rate of the horizontal deflection of the scanning beam 62, and the frequency of the carrier signal that modulates the horizontal deflection signal, are selected to cause successive alternations in the scanlines *c, d,* and *e* of FIG. 3 to merge and effectively increase the width of these scanlines in the middle portions thereof. The amplitude of the alternations therefore effectively determines the width of the scanlines. The limiter 57 in FIG. 1 insures that the alternations in different scanlines do not overlap. Since the amplitudes of the alternations are directly dependent upon the tones in the transparency 12, the line halftones produced by the varying width scanlines effectively duplicates but provides a negative of the continuous tones in the transparency 12. The remaining scanlines *f* and *g* in in FIG. 3 are similar to the scanlines *a* and *b* thereof. It is to be noted that a single line continuous scanning pattern may also be utilized, rather than raster scanning, as long as the film 16 is moved to provide the second dimensional motion needed to trace two-dimensional images.

It is to be noted that the line halftones may also be produced from stored signals such as in a memory device 110, shown dotted in FIG. 1. In such a case, the signals from the memory 110 are applied directly to the amplifier 40 and the photodiode 38 is disconnected from the circuit. The driving of the line halftone image generator 42 by the memory device 110 permits images to be stored in the device 110 in the form of digital signals and then subsequently displayed on the face of the cathode ray tube 14 in the form of line halftone images.

The straight line halftone images produced by the halftone generator 42 may be changed to provide a wavy line halftone image, similar to line screned halftones, by coupling a low frequency oscillator 112, that generates low amplitude sinewaves directly to the summing amplifier 58 as well as to the deflection and bias circuits 32 to control the deflection of the flying spot scanner 20 in synchronism with the cathode ray tube 14. Connecting such an oscillator creates undulating scanlines because the low frequency, low amplitude sinewaves add to and substract from the vertical deflection signal. The oscillations from the oscillator 112 are synchronized with the deflection signals by applying a synchronizing signal (sync) from the deflection and bias circuits 32 to the oscillator 112.

The undulating scanlines are broken at random to create a mezzo effect by applying the low frequency oscillations from the oscillator 112 and an aperiodic wave from a noise generator 114 to a modulator 116.

It is to be noted that the scanning beam 62 may also be defocused in accordance with the tones in a continuous tone image to provide a line halftone image similar to the images derived from the halftone generator 42. When the scanning beam 62 widens due to defocusing, a compensation circuit may accelerate the electrons in the beam 62 to provide uniform exposure on the film 16.

Thus in accordance with the invention, an electronic line halftone image generator utilizes scanline width modulation in a cathode ray tube to provide halftone images. The scanlines in the tube narrow or widen depending on the tones in the original image.

What is claimed is:

1. An electronic halftone image generator comprising in combination:

an imaging device having a face for displaying scanlines, means providing an electronic image signal having amplitudes corresponding to tones to be reproduced on said imaging device, means providing a first oscillatory signal for applying transverse alternations to said scanlines in said imaging device, means selecting said oscillatory signal to exhibit a first frequency that causes successive transverse alternations in said scanlines to merge into each other to effectively widen said scanlines, means for modulating said oscillatory signal with said electronic image signal so as to provide a tone modulated oscillatory signal having amplitudes that correspond to tones to be reproduced, means for converting said tone modulated signals into signals that simulate woodcut patterns, said converting means including an oscillator for providing a second oscillatory signal of a second frequency substantially lower than said first frequency, and means for superimposing said second oscillatory signal onto said tone modulated oscillatory signal to produce an undulating tone modulated oscillatory signal, and means for applying said undulating tone modulated oscillatory signal to said imaging device to superimpose transverse alternations on said scanlines so as to produce undulating scanlines having varying widths that simulate said tones.

2. The combination in accordance with claim 1 that further includes means for aperiodically breaking said undulating scanlines so as to simulate mezzo halftone images.

References Cited

UNITED STATES PATENTS

| | | | |
|---|---|---|---|
| 2,082,692 | 6/1937 | Finch | 178—6.7 |
| 2,681,382 | 6/1954 | Hilburn | 178—6.7 |

OTHER REFERENCES

I.B.M. Technical Disclosure Bulletin, vol. 9, No. 7, December 1966.

RICHARD MURRAY, Examiner

R. K. ECKERT, Jr., Assistant Examiner

U.S. Cl. X.R.

178—7.4; 315—25, 30